United States Patent
Hernando Campos et al.

(10) Patent No.: US 9,885,808 B2
(45) Date of Patent: Feb. 6, 2018

(54) COATING WITH PHOTOCHROMIC PROPERTIES, METHOD FOR PRODUCING SAID COATING AND USE THEREOF APPLICABLE TO OPTICAL ARTICLES AND GLAZED SURFACES

(71) Applicant: CONSEJO SUPERIOR DE INVESTIGACIONES CIENTIFICAS (CSIC), Madrid (ES)

(72) Inventors: Jordi Hernando Campos, Bellaterra (ES); Claudio Roscini, Bellaterra (ES); Nuria Alexandra Vazquez Mera, Bellaterra (ES); Daniel Ruiz Molina, Bellaterra (ES)

(73) Assignee: CONSEJO SUPERIOR DE INVESTIGACIONES CIENTIFICAS(CSIC), Madrid (ES)

( * ) Notice: Subject to any disclaimer, the term of this patent is extended or adjusted under 35 U.S.C. 154(b) by 342 days.

(21) Appl. No.: 14/382,826

(22) PCT Filed: Mar. 5, 2013

(86) PCT No.: PCT/ES2013/070132
§ 371 (c)(1),
(2) Date: Sep. 4, 2014

(87) PCT Pub. No.: WO2013/132123
PCT Pub. Date: Sep. 12, 2013

(65) Prior Publication Data
US 2015/0024126 A1    Jan. 22, 2015

(30) Foreign Application Priority Data
Mar. 8, 2012    (ES) .................................. 201200238

(51) Int. Cl.
*B01J 13/16*  (2006.01)
*G02B 1/10*   (2015.01)
(Continued)

(52) U.S. Cl.
CPC ................ *G02B 1/10* (2013.01); *B01J 13/16* (2013.01); *B05D 5/06* (2013.01); *C09B 23/0066* (2013.01);
(Continued)

(58) Field of Classification Search
CPC ...................... B01J 13/02–13/22; G03C 1/002
See application file for complete search history.

(56) References Cited

U.S. PATENT DOCUMENTS

| 5,221,288 A | 6/1993 | Kamata et al. |
| 6,117,455 A | 9/2000 | Takada et al. |

(Continued)

FOREIGN PATENT DOCUMENTS

| CN | 101225296 | 7/2008 |
| EP | 0 670 659 | 9/1995 |

(Continued)

OTHER PUBLICATIONS

International Search Report dated Jun. 26, 2013 in International (PCT) Application No. PCT/ES2013/070132.

*Primary Examiner* — Elizabeth A Burkhart
(74) *Attorney, Agent, or Firm* — Wenderoth, Lind & Ponack, L.L.P.

(57) ABSTRACT

Coating with photochromic properties, method for producing said coating and use thereof applicable to optical articles and glazed surfaces. The coating is formed by the combination of the following three elements: (1) a polymeric matrix, which is typically rigid and deposited on the surface of interest; (2) hollow, sealed micro- and/or nanocapsules dispersed within said matrix; and (3) solutions of photochro- (Continued)

mic compounds (chosen from a group comprising spirooxazine, azobenzenes or chromenes) in a liquid solvent that does not react (with the photochromic compound and with the capsule wall), which are encapsulated inside said micro- or nanocapsules.

10 Claims, 9 Drawing Sheets

(51) Int. Cl.
  *G02B 5/23* (2006.01)
  *B05D 5/06* (2006.01)
  *G02B 1/04* (2006.01)
  *G03C 1/00* (2006.01)
  *G03C 1/73* (2006.01)
  *C09B 23/01* (2006.01)
  *G02B 5/20* (2006.01)

(52) U.S. Cl.
  CPC .............. *G02B 1/04* (2013.01); *G02B 5/206* (2013.01); *G02B 5/23* (2013.01); *G03C 1/002* (2013.01); *G03C 1/73* (2013.01)

(56) References Cited

U.S. PATENT DOCUMENTS

| | | |
|---|---|---|
| 6,217,893 B1 | 4/2001 | Pellet et al. |
| 6,242,099 B1 | 6/2001 | Grandmontagne et al. |
| 2003/0030040 A1 | 2/2003 | Luthern et al. |
| 2003/0086978 A1* | 5/2003 | Kim .................. C09K 9/02 424/501 |
| 2008/0311490 A1 | 12/2008 | Norslen et al. |
| 2011/0082035 A1 | 4/2011 | Morimitsu et al. |

FOREIGN PATENT DOCUMENTS

| | | | |
|---|---|---|---|
| EP | 1 473 592 | | 11/2004 |
| GB | 969754 | | 9/1964 |
| GB | 2 270 321 | | 3/1994 |
| GB | 2 431 159 | * | 4/2007 |
| JP | 39-27286 | | 11/1939 |
| JP | 61-236531 | | 10/1986 |
| JP | 03-051195 | * | 3/1991 |
| JP | 3-137634 | | 6/1991 |
| JP | 4-209692 | | 7/1992 |
| JP | 7-216350 | | 8/1995 |
| JP | 7-245734 | | 9/1995 |
| JP | 8-151321 | | 6/1996 |
| JP | 8-209119 | | 8/1996 |
| JP | 9-31453 | | 2/1997 |
| JP | 9-183969 | | 7/1997 |
| JP | 09-241626 | | 9/1997 |
| JP | 2000-504033 | | 4/2000 |
| JP | 2002-500631 | | 1/2002 |
| JP | 2006-26457 | | 2/2006 |
| JP | 2007-79023 | | 3/2007 |
| JP | 2008-31023 | | 12/2008 |
| JP | 2009-120536 | | 6/2009 |
| JP | 2009-144011 | | 7/2009 |
| JP | 2010-79176 | | 4/2010 |
| WO | 89/05335 | | 6/1989 |
| WO | 2009/136668 | | 11/2009 |

* cited by examiner

Disperse Red 13   FIG. 4(E)

COATING WITH PHOTOCHROMIC PROPERTIES, METHOD FOR PRODUCING SAID COATING AND USE THEREOF APPLICABLE TO OPTICAL ARTICLES AND GLAZED SURFACES

FIELD OF THE INVENTION

The present invention relates, in a first aspect, to a coating with photochromic properties, applicable to optical articles and transparent, translucent or reflective glazed surfaces; however, this is not a limitation of the material and the coating described may also be applied on metallic surfaces, for example. The coating is formed by a polymeric matrix within which hollow micro- or nanocapsules which contain solutions of one or various photochromes are dispersed. The cortex of the capsule isolates and protects the solution of the photochromes, in such a way that when the encapsulated material is included in any other medium (for example, a rigid matrix), the photoactivity characteristic of the photochromes in solution is maintained. Furthermore, the cortex acts like a compatibilizing agent which facilitates the dispersion of the encapsulated photochromic material in any polymeric matrix.

The invention is applicable to any type or combination of photochromic compounds within any solid matrix without affecting the optical and interconversion properties of the photochromes used.

In a second aspect, the invention describes a method for producing said coating.

And in a third aspect, the invention proposes the use, under specific conditions, of said coating on a rigid polymeric, metallic, glass surface, etc.

BACKGROUND OF THE INVENTION

Photochromic compounds are systems which, by stimulation with electromagnetic radiation, interconvert between two states (A and B) which have different colors. Once the irradiation by light is interrupted, the photoinduced state B may be thermally cooled down and return at the initial state A (B→A). Furthermore, the interconversion B→A may be induced by photochemical means, irradiating at a wavelength different from that used for the interconversion A→B. The A→B interconversion velocities (direct process) and B→A (reverse process) vary according to the wavelengths used, the temperature, the intrinsic properties of the photochromic compounds (i.e. structure, interconversion mechanism) and obviously, of the medium where the molecules of the photochromic material are dissolved/dispersed. Generally, the photoinduced processes (direct or reverse) are the fastest and their velocity is less affected by these experimental parameters. On the other hand, when the reverse process is carried out thermally, the velocity thereof depends to a large degree on the temperature and the medium.

The two states of each photochromic compound absorb on specific areas of the electromagnetic spectrum. The variety of photochromic compounds available on the market allows different regions of this spectrum to be covered in the area of UV-Vis. From among the most common photochromes, the following types of molecules and the corresponding interconversion mechanisms may be highlighted:

Spirooxazines which pass from a closed state to an open state by means of breaking/forming a C—O bond;

Azobenzenes which pass from a state with a trans configuration of the N=N bond to a state with a cis configuration;

Chromenes which pass from a closed state to an open state.

For all of these photochromic systems, the interconversion between the two states thereof requires a geometric and significant conformational change at the molecular level. Said interconversions are generally fast in solution, where the molecules have a large degree of movement. On the other hand, the interconversion velocity, and very particularly for the reverse thermal process B→A, is greatly affected when these compounds are dispersed directly on a solid environment. This is a significant problem since for many uses, these compounds are used in a solid state. For example, in many cases, they are used as coatings, and therefore they need to be deposited on a rigid polymeric, metallic, glass surface, etc. It is evident that the direct deposition of the material on a surface would have the main disadvantage of being overly exposed to external factors. Mechanical actions or chemical attacks (solvents, acids-bases, reagents) would cause a rapid degradation of the coating. On the other hand, although in solution the photochromic system has characteristic optical properties, once it is deposited on a surface in crystalline form or dispersed in a polymer, its properties may be significantly changed. Firstly, the absence of solvent directly influences the energy of the absorption bands, altering, in effect, the absorption spectrums of the states of the photochromic system (and thus, the color thereof). Secondly, the absence of solvents and the presence of steric impediment due to the polymeric chains located around the photochromic molecule or other photochromic molecules in the crystalline phase alter the interconversion kinetics, significantly reducing the velocity even, in some cases, losing the reversibility of the process. This consequence could be very negative in those systems which require a quick recovery to the initial state of the photochromic material. Therefore, it is important to obtain a system which at the same time allows: a) the photochrome to be chemically and physically protected from the outside environment and b) the optical and interconversion properties of the same to be maintained once deposited on a surface. In order to obtain this system, it is necessary for the photochromic molecules on the solid layer to be in a micro/nano environment which allows them to be protected and to, preserve their photoactivity.

In order to achieve this result, various approaches have been tried:

1. One of the methods used the most during recent years consists of dispersing the photochromic material of interest in nanostructured porous materials such as zeolites, mesoporous silica sheets or mesoporous silica particles (e.g. DE102006033906, EP1849844). The presence of cavities of nanometric scale in these materials allows the photochrome molecules to disperse evenly inside the pores of the matrix. This gives a certain degree of physical protection to the photochromes when the porous-photochrome matrix system is used as a coating. Furthermore, the pores guarantee the photochromic molecules a sufficient free volume around them so that they can maintain the interconversion kinetics observed in solution. In spite of this, the presence of pores in contact with the outside would not prevent the possibility of solvents and/or other chemical agents entering inside and degrading the photochromic material. Furthermore, so that the photochromic molecules enter the pores and interact with the porous matrix, the two components must have a certain compatibility, which limits the use of this methodology for some types of systems.

2. For the purpose of having micro and/or nano cavities whereon the photochromic molecules disperse such that these molecules have the desired mobility, it has been proposed to include photochromes inside of dendrimers or hyper-branched polymers (e.g. WO2009072988). At temperatures higher than 10° C. and thanks to the high flexibility of the side branches of these polymeric systems, the included photochrome molecules have suitable mobility to maintain their photoactivity to a large extent. In the case of dendrimers, these are formed by a solid cortex and a flexible core with internal cavities where small amounts of solvent and photochromic molecules with a certain affinity for the functional groups present inside them may be included. On the other, hand, the hyper-branched polymers are globular polymers of amphiphilic nature. Their apolar outside allows them to interact with apolar matrices and their polar core is a carrier of organic polar additives (in this case, the photochromes). The photochromic molecules are physically included in the system by means of co-precipitation such that they are distributed in a homogenous manner in the matrix of interest without modifying the properties thereof.

3. Instead of creating a micro/nano environment for the photochromic material which guarantees the preservation of the photochromic activity observed in solution, in other studies, attention has been centered on developing new photochromes with special interconversion mechanisms. In particular, molecules have been designed for which the conversion between the two states of the system does not require large conformational changes, such that the kinetics of this process is only very slightly affected by the encapsulation thereof in the rigid matrices (*A fast molecule that colors only under UV Light*, Y. Kishimoto, J. Abe, *J. Am. Chem. Soc.* 2009, 131, 4227-4229). These molecules, based on bisimidazol systems, undergo a photoinduced homolythic breaking a C—N bond to pass from one state to another, giving rise to the formation of two free radicals which quickly recombine to return to the initial system independently from the medium. However, only a very limited number of the molecules have these properties, which limits their use based on the necessary requirements in each case (i.e. change of desired color).

4. Instead of creating a free volume where the photochrome may have high mobility, another strategy developed during recent years consists of introducing the photochromic molecules in a medium of low rigidity where they can move easily. For example, this may be achieved by means of including the photochromic compounds in polymeric matrices with a low glass transition temperature (Tg), such that they have a viscous liquid behavior at room temperature. As a consequence of this, the photochromic molecules have sufficient freedom of movement to maintain to a large extent their interconversion kinetics. However, said polymeric matrices of low Tg have poor mechanical properties, which is why their use is not feasible as a coating in the majority of uses. In order to overcome this drawback, it is proposed to cover said matrices with other more mechanically resistant materials. For example, an approach of this type consists of covalently joining the photochromic molecules of interest to oligomers of low Tg, which are wound in a spontaneous manner around the photochrome and subsequently are dispersed in a rigid polymeric matrix. In this way, the nanometric environment of the photochromic molecules is sufficiently flexible so as to allow the rapid interconversion thereof between the two states, at the same time that the outer polymer of high Tg provides the desired mechanical and structural properties to the material (e.g. WO2006024099, US2009093601, U.S. application Ser. No. 11/574,654 (published as US2009/0093601), WO2009121148 and WO2009146509). In the systems cited in the technical literature, an oligomer-photochrome ratio around 1/1 is used and in a rather low proportion with respect to the total mass of the rigid polymeric matrix to minimize the changes to the mechanical properties of said matrix.

5. An approach closely related to the previous methodology has been developed and patented by Koninklijke Philip Electronics NV (WO 03/001555). In this case, the photochromic compound is included in particles with core-shell structures, which may be dispersed in a rigid matrix of interest (for example, in a polymer with Tg higher than 50° C.). The core of said capsules is formed by polymers of low Tg (lower than 40° C., preferably lower than 10° C.), where the photochromic molecules are included as dopant by means of swelling. In said core, the photochromic molecules have sufficient mobility so as to preserve the rapid interconversion between the two states thereof. On the other hand, the cortex, composed of cross-linked polymers of high Tg, maintains the integrity of the core and consequently, of the included photochrome and protects it from reactive substances which may alter the properties thereof. Furthermore, the good mechanical properties of said cortex allow the encapsulated photochromic system to be included in coatings. A problem presented by this approach is that the behavior of the system is very dependent on the temperature and is limited by the Tg of the core of the particles. For example, if said Tg is ~10° C., the system could have different interconversion velocities between its two states as a function of what the thermal contrast between day and night is. A similar approach based on core-shell capsules has been developed by the American Optical Corporation (U.S. Pat. No. 4,367,170). In this case, the core is formed by a resinous organic material in which the photochromic compound is dispersed; regarding the cortex, this is formed by a suitable inorganic material. As in the preceding methodology, the cortex protects the core from external factors and allows the capsule-photochrome system to be included in rigid polymeric matrices for an possible use as a coating. In both cases, a problem which may be encountered in this type of approaches is the difficulty to dissolve some types of photochromes in organic resins or in polymers of low Tg.

This invention describes a new methodology by means of which photochromes may be introduced into solid matrices, preserving the behavior and the interconversion kinetics thereof which are demonstrated in solution. The approach which is used consists of the formation of core-shell capsules, the core of which is formed by a solution of the photochrome of interest in a liquid solvent and is protected from the outside by a solid and impermeable cortex which has mechanical and structural resistance. This allows said capsules to be able to be included in rigid polymeric matrices without the optical and interconversion properties of the photochrome content being affected. Furthermore, the cortex of the capsules acts as a protective layer against reactive substances which put at risk the preservation of the photochromic activity, contributing to the increase in stability and thus, the durability of the system.

The present inventors have not found previous examples online with this approach. Moreover, although examples of encapsulation of pigments in capsules with solvents are described, in no case do the encapsulated substances have photochromic activity (e.g. U.S. Pat. No. 4,517,141 and U.S. Pat. No. 4,428,978). Furthermore, when they found patents which described the encapsulation of photochromic systems, the family of capsules is not specified and only very specific uses for inks are described (e.g. U.S. Pat. No. 5,807,625 and U.S. Pat. No. 5,017,225). Lastly, the technology claimed is more universal and more adaptable to the different uses with respect to the existing technologies.

BRIEF DESCRIPTION OF THE INVENTION

The present invention provides a coating with photochromic properties applicable to optical articles and glazed surfaces, formed by the combination of the following three elements:

(1) a polymeric matrix (advantageously rigid) deposited on the surface of interest;

(2) hollow and sealed micro- and/or nanocapsules dispersed within said matrix; and (3) solutions of photochromic compounds (chosen from a group comprising spirooxazine, azobenzenes or chromenes) in a non-reactive liquid solvent (with the photochromic compound and with the capsule wall), which are encapsulated inside said micro- or nanocapsules.

The invention comprises capsules which encapsulate one or more different photochromic systems in such a way that said photochromic systems absorb at different wavelengths. Likewise, said capsules may have a micrometric size of between 1 and 10000 micrometers or be nanometric with a size of between 20 and 1000 nanometers.

The cortex of the capsule is chosen from among an organic, inorganic or hybrid material and in particular may be polyamide or melamine and formaldehyde.

As it has been indicated, in a second aspect, the invention proposes a method for producing a coating with photochromic properties applicable to optical articles and glazed surfaces, which comprises:

the encapsulation of photochromic compounds in hollow and sealed micro- and/or nanocapsules, in solution in a liquid solvent that does not react with the photochromic compound and with the wall or cortex of the capsule of polymeric nature, the dispersion of said capsules in a polymeric matrix deposited on a surface of interest to be covered.

Lastly, the invention provides the use of one or more photochromic compounds in solution and encapsulated according to that which has been previously explained for forming coatings suited for surfaces of optical articles and glazed surfaces, temporary staining, etc.

The most innovative aspects which may be highlighted regarding that which is proposed by this invention may be summarized as follows:

1. The optical and interconversion properties of the photochrome encapsulated in the manner described and dispersed in a solid polymeric matrix are maintained identical to those observed in solution.

2. The micro/nano encapsulation technology photochromic coatings to be prepared, dispersing the capsules in a polymeric matrix or simply depositing the capsules on the surface of interest.

3. In any photochromic coating, additional protective layers are not required since the cortex itself of the capsule acts as a protective agent. In this way, the durability of the photochromic activity is increased and the cost of the photochromic coating can be reduced.

4. The technology developed allows a) the solubility of the photochrome and b) its compatibility with the polymeric matrix, with which it is desired to prepare the photochromic coating, to be simultaneously improved.

In relation to the universality of the proposed methodology and the advantages derived from the use thereof, the following may be highlighted:

5. Different methodologies have been developed and different chemical compounds have been used to form the capsules and in all the cases, the encapsulated photochromes maintain the properties observed in solution. Furthermore, in all of these methodologies, the inclusion of the photochrome in the core of the capsule is relatively simple as much as it is direct and does not require intermediate swelling processes. In fact, in one single step, the cortex of the capsules is formed and the solution of the photochromes is trapped inside thereof.

6. It has been observed that the technology developed allows, once the capsules containing the photochromic solutions have been obtained, the dispersion of said capsules in any polymeric matrix (rigid or otherwise) which may be organic, inorganic or hybrid, offering the possibility of being able to use this type of material as a coating for any type of use.

7. The technology developed allows capsules with a core which can be formed by any solvent (organic or inorganic) or by a mixture of solvents to be created. The possibility to be able to choose the solvent allows the number of photochromic systems capable of being encapsulated to be increased. In this way, photochromic molecules of different types can be dissolved in the suitable solvent in such a way that the solubility thereof can be increased, the absorption spectrum of the two species (A and B) can be adjusted or, in the event that the use so requires, the material can be used at different temperature ranges.

8. Using the technology developed, capsules of any size can be synthesized at micro- and nanometric ranges. This is an important factor when transparent coatings are prepared, since reducing the size of the capsules minimizes the dispersion of the visible light and therefore the capsules may end up being imperceptible in the medium in which they are dispersed.

9. It has been shown that the cortex of the capsules may be of any nature, including organic, inorganic or hybrid type materials. This allows the size and the mechanical and optical properties of the capsules to be adjusted to the required values, as well as having systems which show a good compatibility with the polymeric matrix in which they will eventually be dispersed.

10. It has been shown that the encapsulation of any type of photochrome can be carried out Therefore, photochromes which absorb at any range (wavelength) of the UV-Vis spectrum may be encapsulated. Furthermore, the same technology may be used for encapsulating two or more photochromic systems which absorb at different wavelengths, increasing the color combinations and thus the number of uses of the photochromic coating developed.

11. The encapsulation of the photochromes in solution allows their optical and interconversion properties to be maintained, independently from the interconversion mechanism involved in the photochromic activity thereof.

12. This methodology allows capsules containing photochromic solutions of any scale to be synthesized: from a laboratory scale to an industrial scale.

prepared using (A, B) PVP (25% w/w) or (C, D) Tween 20® (1% w/w) as a stabilizer (bar=(A) 20 nm, (B) 200 nm, (C) 500 nm, (D) 100 nm).

FIGS. 2(A), 2(B), 2(C), 2(D), 2(E) and 2(F) show optical microscopy images of polyamide microcapsules (diameters between 1-100 μm) prepared using PVP (20% w/w) as a stabilizer (bar=(A) 50 μm, (B) 50 μm, (C) 100 μm, (D) 200 μm, (E) 50 μm, (F) 50 μm).

FIGS. 3(A), 3(B), 3(C), 3(D), 3(E) and 3(F) show optical microscopy images of polyamide microcapsules (diameters between 1-1000 μm) prepared using (A, B) PVA (0.4% w/w) or (C, D) PVP (5% w/w) as a stabilizer (bar=(A) 200 μm, (B) 200 μm, (C) 200 μm, (D) 200 μm, (E) 50 μm, (F) 200 μm).

FIGS. 4(A), 4(B), 4(C), 4(D), 4(E) and 4(F) show the transition absorption spectroscopy measurements carried out to characterize the kinetics of the interconversion process B→A of different photochromes (Photorome I, Photorome III and Disperse Red 13) in: (a) rigid polymeric matrices of PVA and PVAc in which these photochromes have been directly dispersed; (b) polyamide capsules in which these photochromes have been encapsulated in solution.

FIGS. 5(A), 5(B), 5(C), 5(D), 5(E) and 5(F) show the transmission electron microscopy (TEM) images of melamine-formaldehyde capsules of nanometric dimensions (diameters between 20-1000 nm) prepared using SDS (1% w/w) as a stabilizer (bar=(A) 200 nm, (B) 200 nm, (C) 200 nm, (D) 200 nm, (E) 100 nm, (F) 200 nm).

Figure 1A:
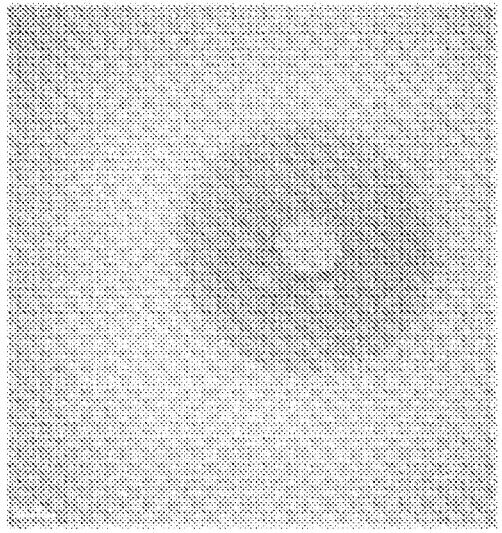
FIGS. 1(A), 1(B), 1(C) and 1(D) show transmission electron microscopy (TEM) images of polyamide capsules of nanometric dimensions (diameters between 20-1000 nm)
Figure 1B:
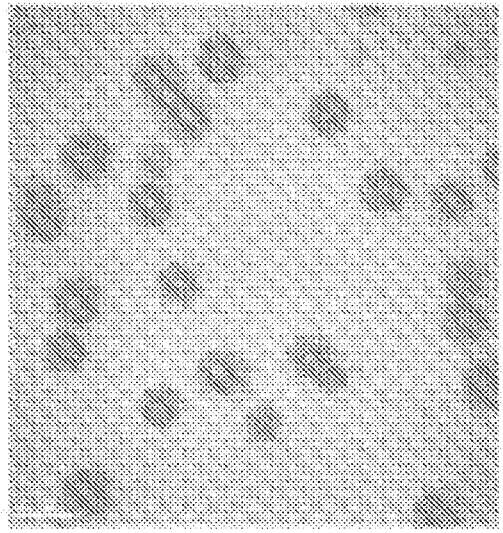
Figure 1C:
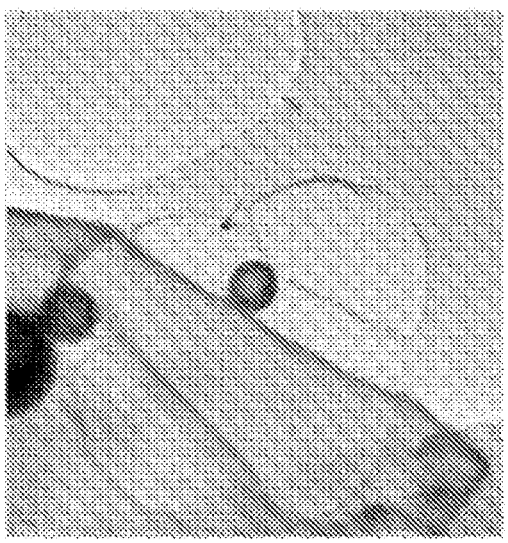
Figure 1D:
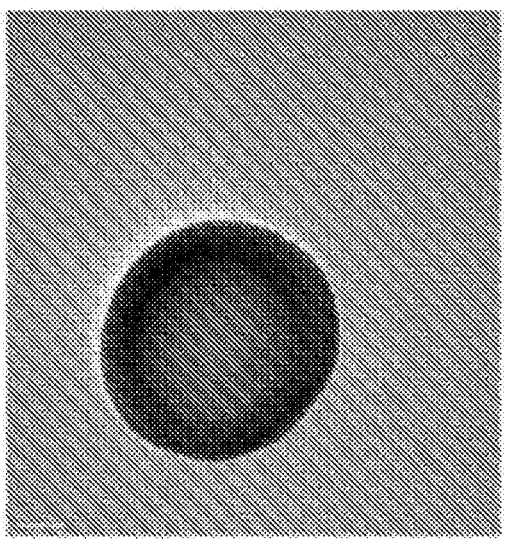
Figure 2A:
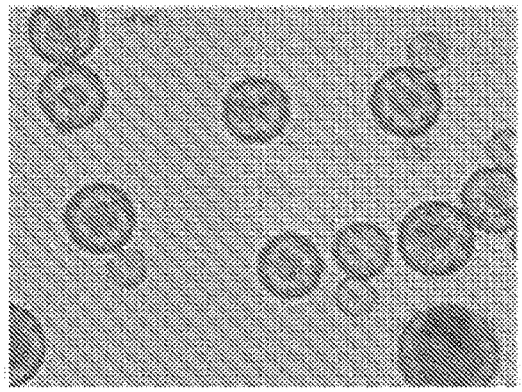
Figure 2B:
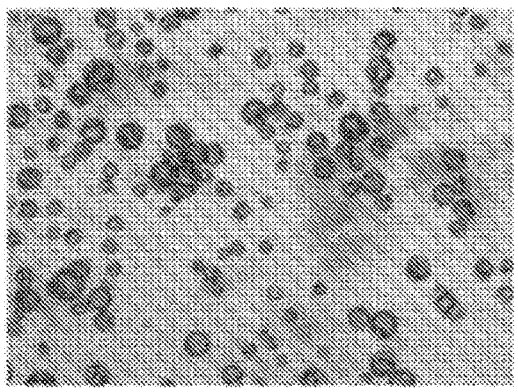
Figure 2C:
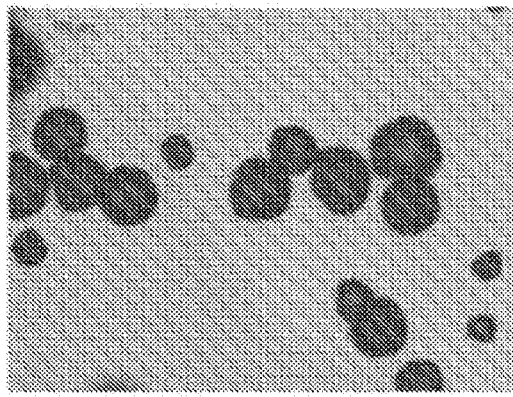
Figure 2D:
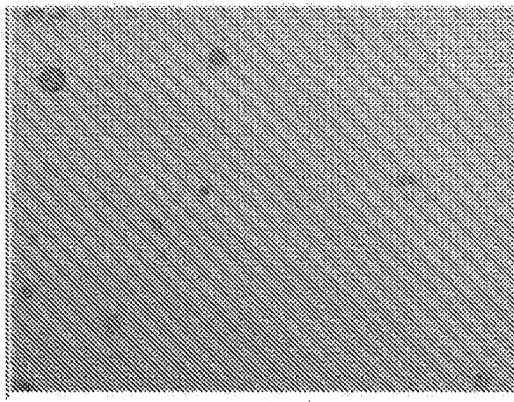
Figure 2E:
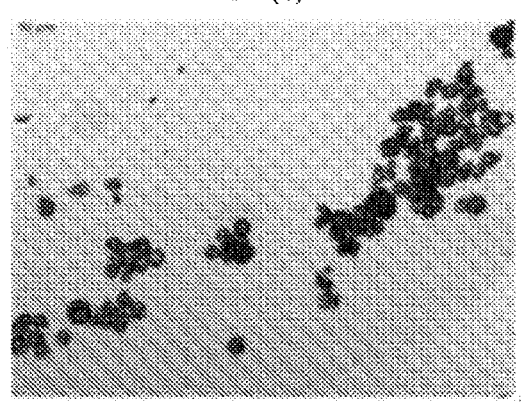
Figure 2F:
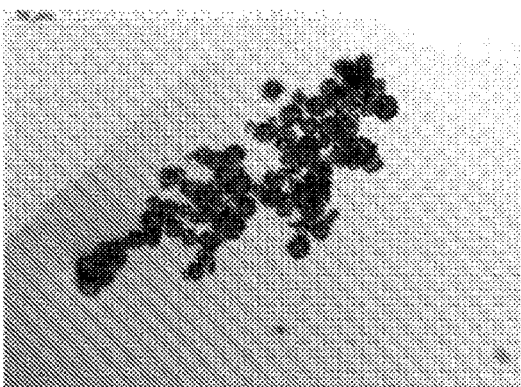
Figure 3A:
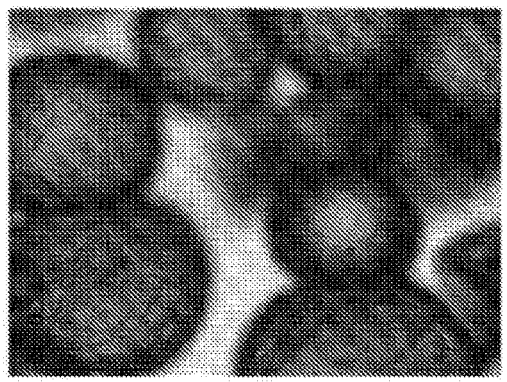
Figure 3B:
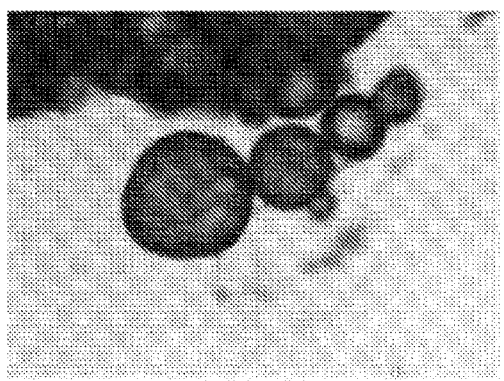
Figure 3C:
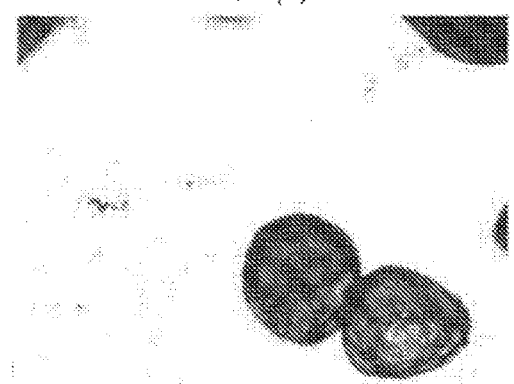
Figure 3D:
Figure 3E:
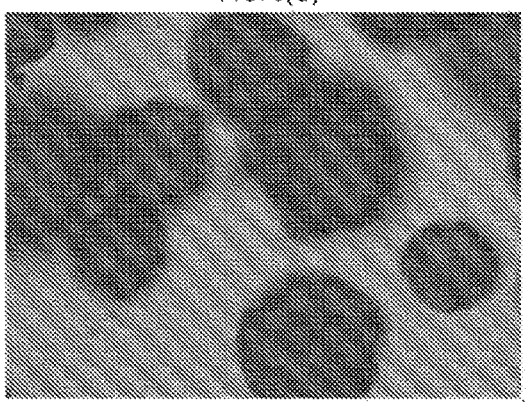
Figure 3F:
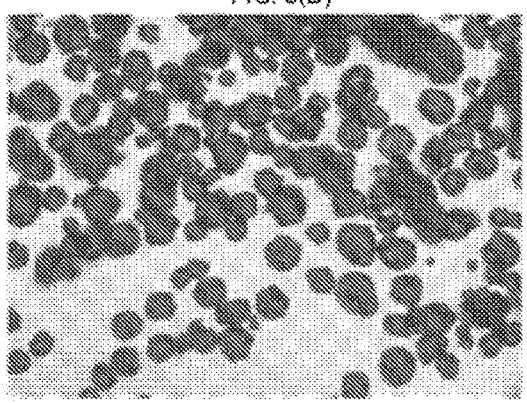
Figure 4A:
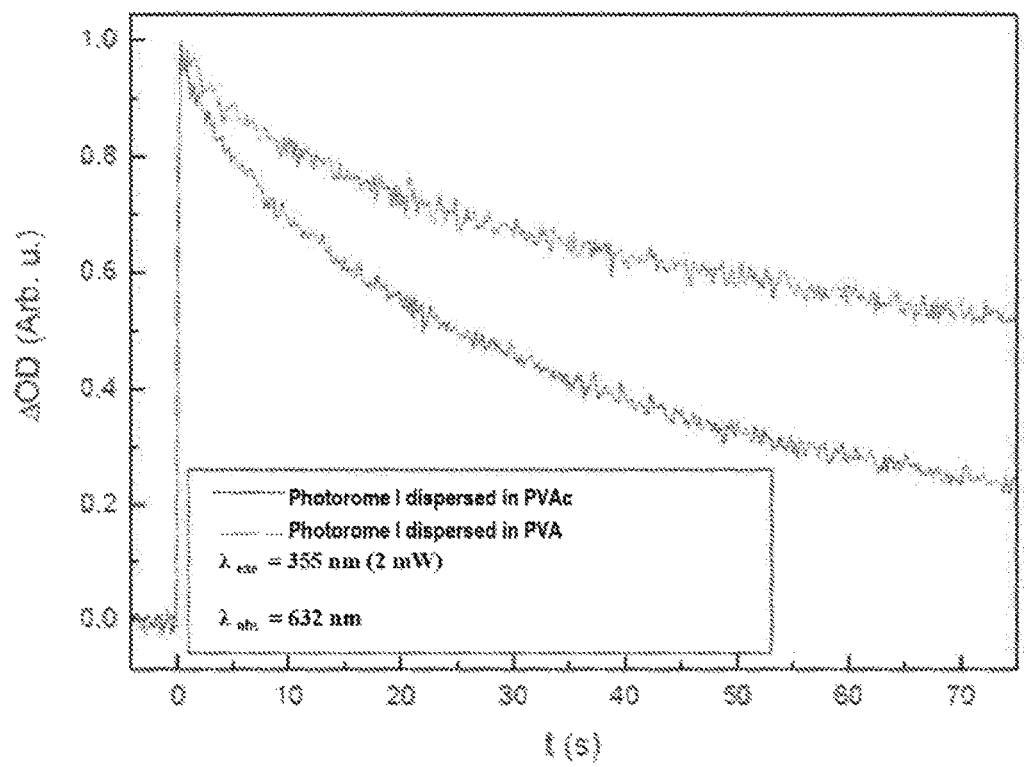
Figure 4B:
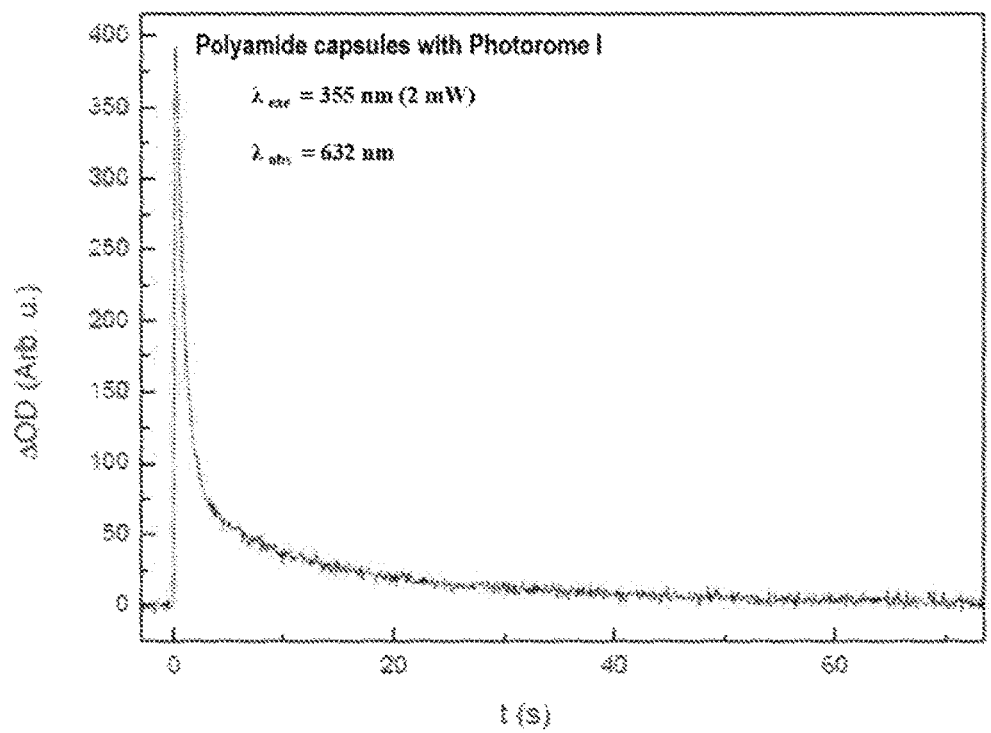
Figure 4C:
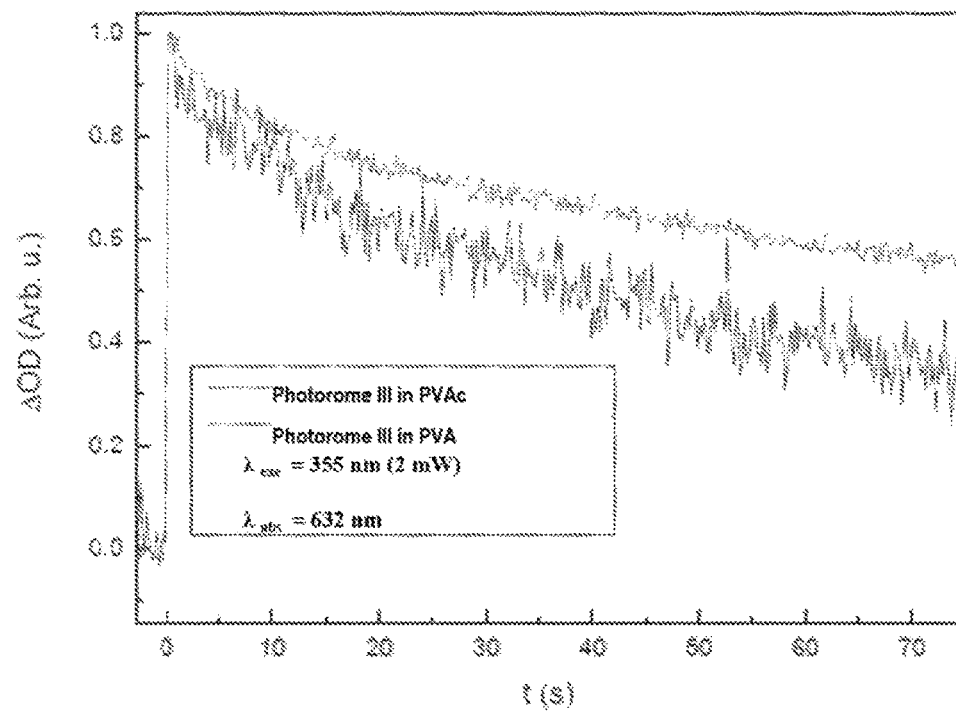
Figure 4D:
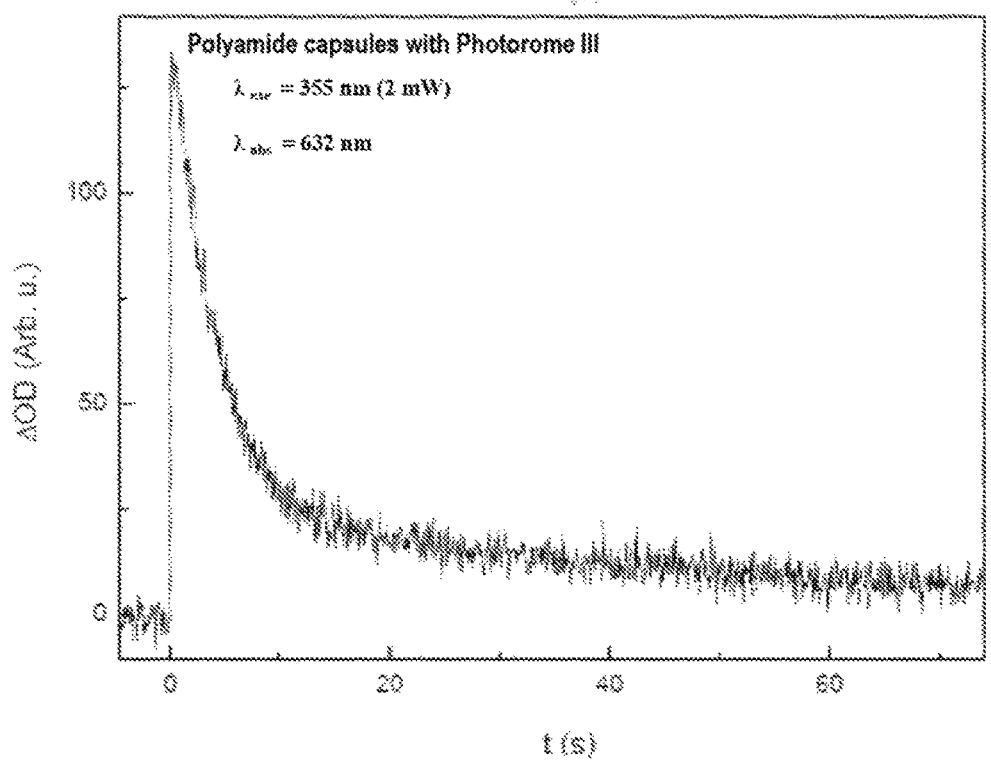
Figure 4F:
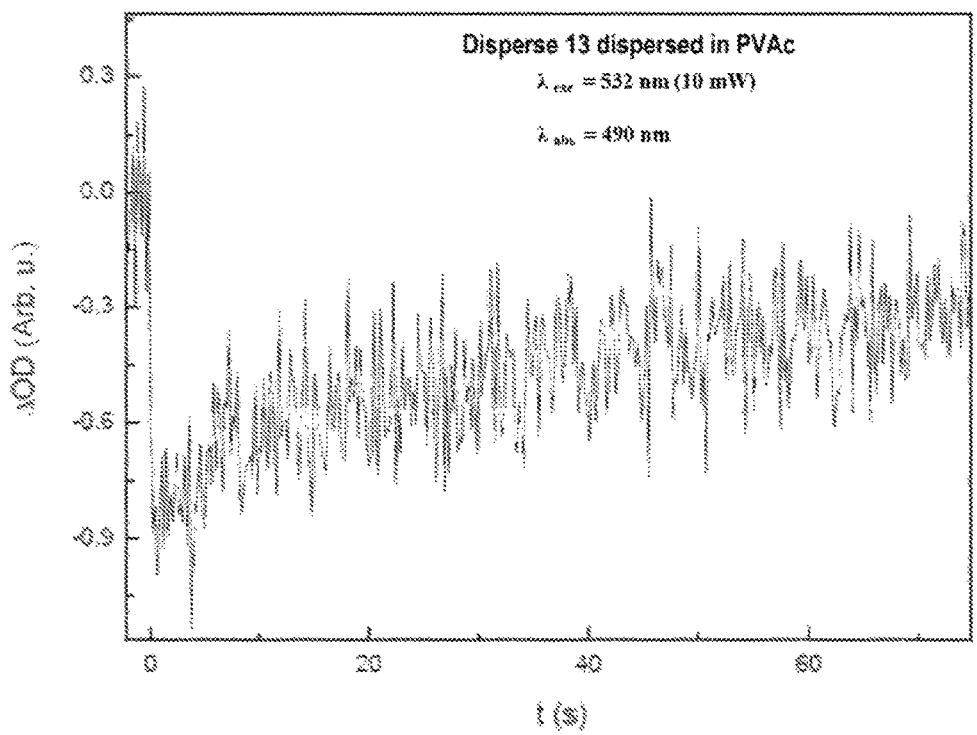
Figure 4F:
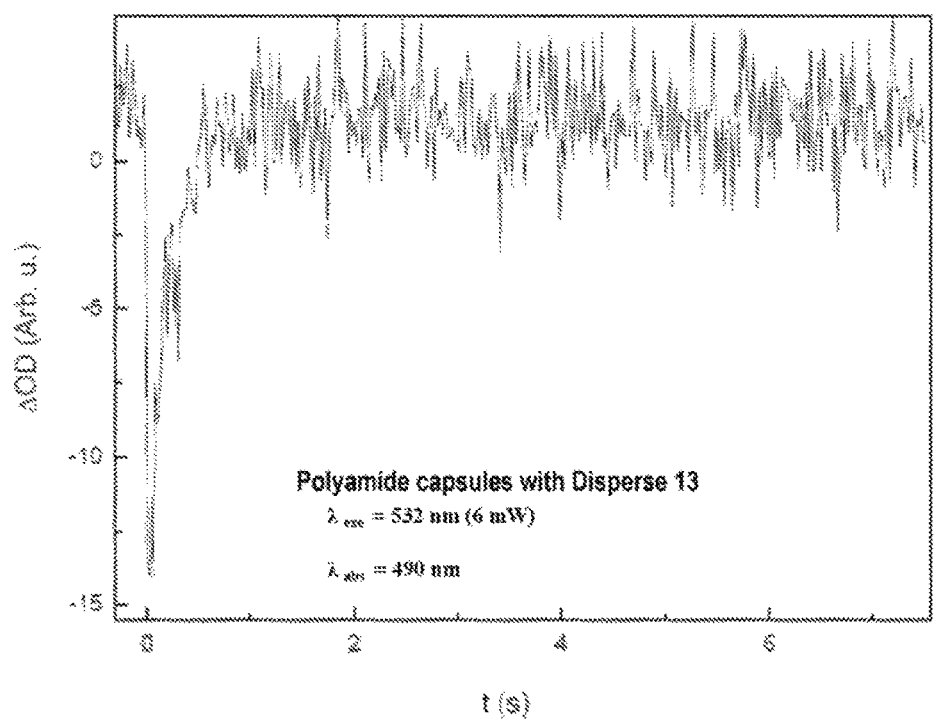
Figure 5A:
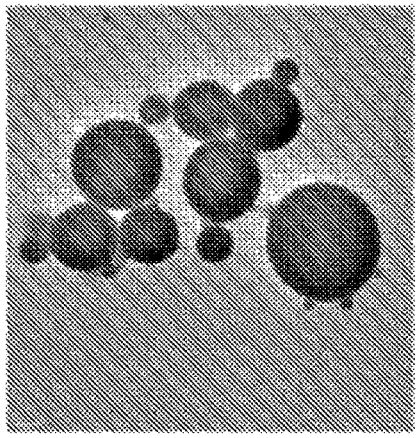
Figure 5B:
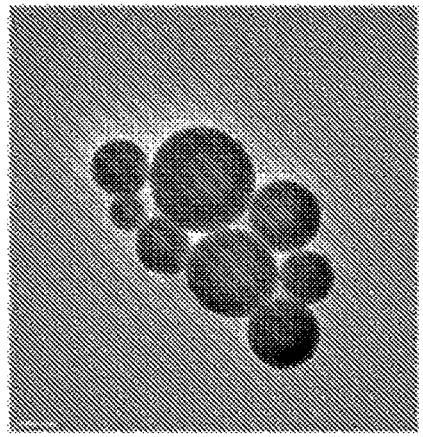
Figure 5C:
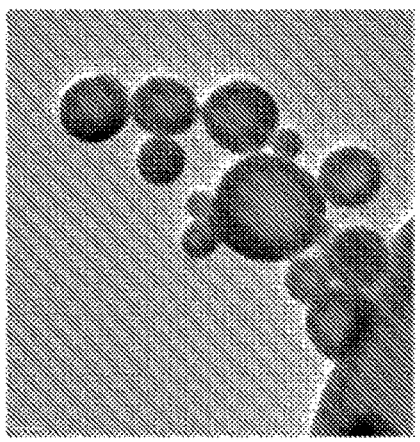
Figure 5D:
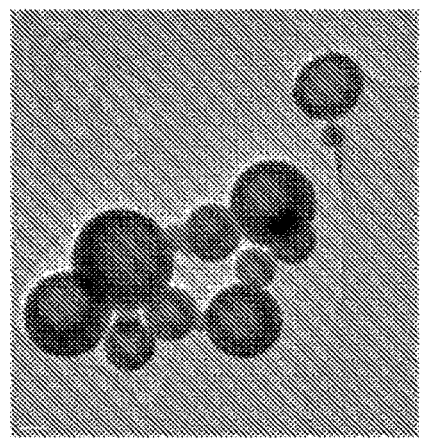
Figure 5E:
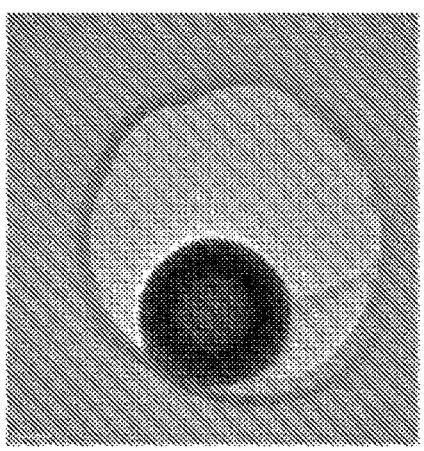
Figure 5F:
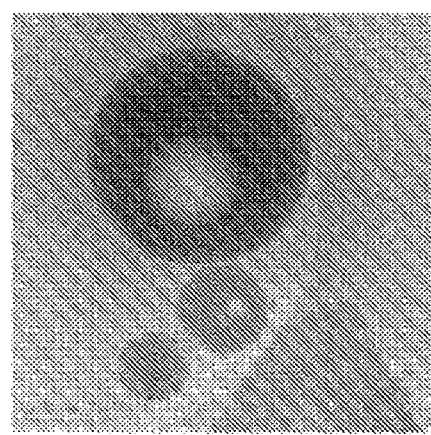
Figure 6A:
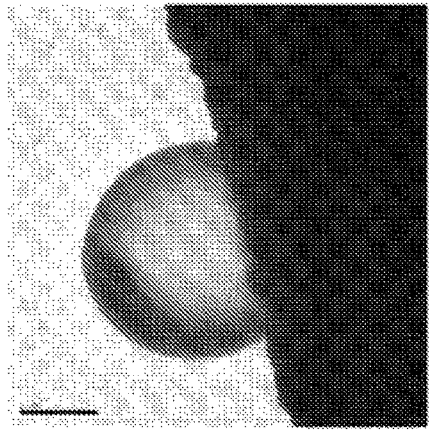
Figure 6B:
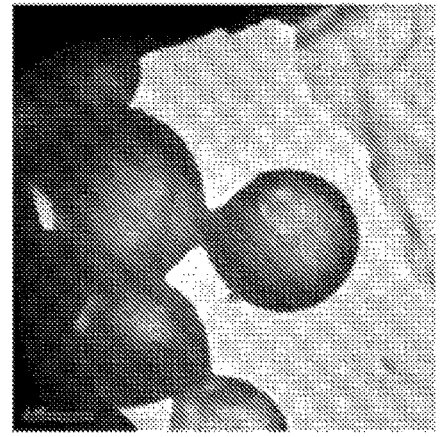
Figure 6C:
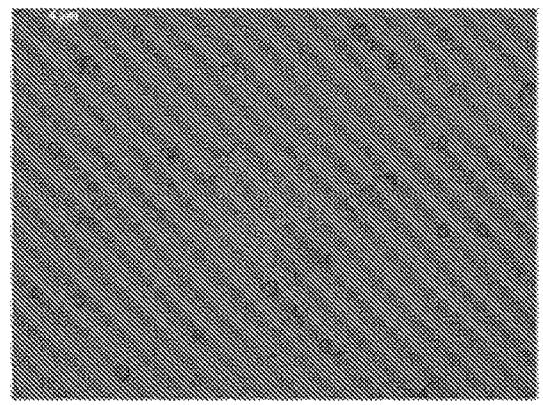
Figure 6D:
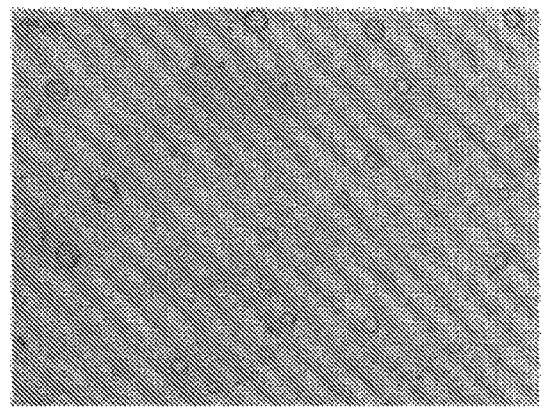

FIGS. 6(A) and 6(B) show TEM microscopy and FIGS. 6(C) and 6(D) show optical microscopy images of melamine-formaldehyde microcapsules (diameters between 1-100 μm) prepared using (A, B) PVP (25% w/w), (C) PVP (8% w/w) or (D) PVP (20% w/w) as a stabilizer (bar=(A) 2 μm, (B) 5 μm, (C) 4 μm, (D) 100 μm).

Figure 7A:
Figure 7B:
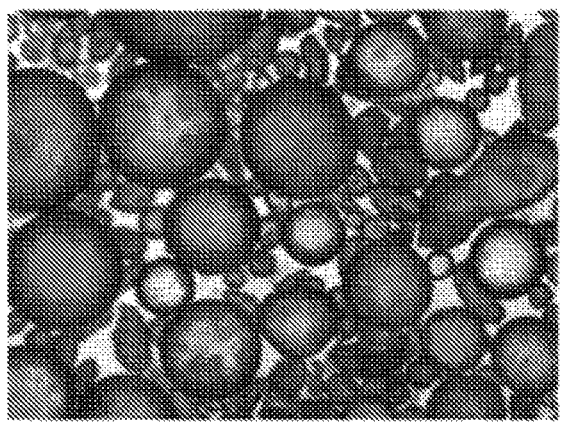
Figure 7C:
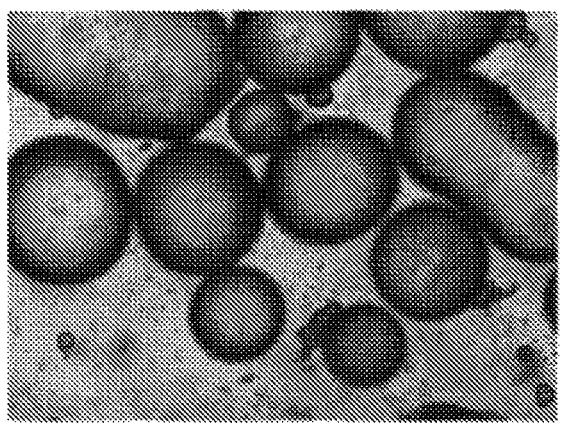

FIGS. 7(A), 7(B) and 7(C) show optical microscopy images of melamine-formaldehyde microcapsules (diameters between 100-1000 μm) prepared using (A) PVP (2% w/w) as a stabilizer or (B, C) without a stabilizer (bar=(A) 100 μm, (B) 100 μm, (C) 200 μm).

BRIEF DESCRIPTION OF EMBODIMENTS OF THE INVENTION

Examples of Micro/Nanocapsules Synthesized Using Different Methodologies and Which Contain Different Solvents and Photochromes.

Below a number of examples of micro- and nano encapsulation of photochromic compounds dissolved in solvents and their use to form rigid coatings, as proposed by this invention, will be described in detail. These examples are only some, of those carried out in the development of the present invention and the are used to intent to show that: (a) the technology described allows the photochromic compounds to be encapsulated inside micro- and nanocapsules with rigid cortex and which contain liquid solvent; (b) the encapsulated photochromic compounds maintain the optical and interconversion properties which they have when they are found in solution; (c) the optical and interconversion properties of the encapsulated photochromes are maintained when the capsules are dispersed inside a rigid polymeric matrix or directly deposited on a surface; and (d) the process may be considered universal and may be applied to the encapsulation of different types of photochromes and using different solvents, as well as to different types of cortexes of the capsules and rigid external matrices.

Example 1

This first example consists of encapsulating solutions of photochromic compounds inside polyamide capsules. The formation of the polyamide capsules takes place in situ by means of an interfacial polycondensation by means of a methodology which has been derived from the proposal of H. Misawa et al for the synthesis of impermeable microcapsules (Laser Manipulation and Ablation of a Single Microcapsule in Water, H. Misawa, N. Kitamura, H. Masuhara, J. Am. Chem. Soc. 1991, 113, 7859-7863). The monomers which are used in this type of polymerization process are acyl di- or trichlorides (dissolved generally in organic solvents) and polyamines (di- or triamines dissolved in aqueous phase). The first step in the synthesis process of the capsules consists of forming an emulsion obtained by mixing and stirring vigorously an organic solution of the acyl chloride of interest with an aqueous phase which contains a stabilizer (PVA, PVP, etc.). This leads to the formation of small micro- and nano droplets of the organic phase dispersed in the aqueous main phase, the size of which depends on the stirring velocity, the nature and concentration of the stabilizer, the type of organic solvent and the initial ratio between the organic phase and the aqueous phase. Then, the amine of interest is added, which quickly induces the beginning of the interfacial polycondensation process where chemically interlinked polyamide chains are formed around the droplets of the emulsion and trap the organic phase used inside them. This gives rise to the formation of capsules with organic solvent inside, the micro- and nanometric size of which is determined by that of the droplets of the initial emulsion. Furthermore, if the photochrome is dissolved in the initial organic solution, the latter remains encapsulated together with the solvent inside the polyamide capsules once the polycondensation reaction has finished (3-24 hours). In the case of this specific example described here, terc phthaloyl chloride and diethylenetriamine has been used as monomers, and PVP (polyvinylpyrrolidone), PVA (hydrolyzed polyvinyl alcohol) or Tween 20® has been used as stabilizers.

On the other hand and in order to demonstrate that the encapsulation process developed can be applied in a general manner to various types of photochromes which absorb at different regions of the UV-Vis spectrum ($\lambda_{max}$) and which interconvert by means of different mechanisms, the encapsulation of various types of commercial photochromes in polyamide capsules has been carried out. It should be pointed out that as a function of the type of photochrome encapsulated, the solvent forming the core of the capsule has been varied, thus demonstrating the universality of the method developed in which reference is made to the encapsulated solvent, which in this case, must be non-miscible with water (Table 1).

TABLE 1

Photochromic systems and solvents encapsulated in polyamide capsules and maximum wavelengths of absorption of the photoinduced (B) states of the photochromes.

| Commercial name | Interconversion mechanism | Solvents | $\lambda_{max}$ (nm) |
| --- | --- | --- | --- |
| Photorome I | Closed-opened | Toluene or CHCl$_3$ | 605 |
| Photorome III | Closed-opened | Toluene | 590 |
| Disperse Red 13 | Trans-cis | Toluene | 490 |

The size of the polyamide capsules prepared has been adjusted by means of the controlled variation of the following experimental conditions: stirring velocity during the emulsification process (600-1500 rpm), nature of the stabilizer (PVA, PVP, Tween 20) and concentration of the stabilizer (PVA: 0.2-0.4%, PVP: 0.4-25%, Tween 20®: 1-10%). Varying these parameters has enabled three families of polyamide capsules of different sizes to be prepared, just as it has been determined by means of the electronic and optical microscopy measurements:

Nanocapsules with diameter between 20-1000 nm (FIG. 1),

Small microcapsules with diameter between 1-100 μm (FIG. 2),

Large microcapsules with diameter between 100-1000 μm (FIG. 3)

The structure of the polyamide capsules prepared has also been analyzed by means of microscopy measurements. As it is observed in FIGS. 1-3, these measurements allow it to be established that the capsules obtained have an outer cortex and an internal cavity, within which the photochrome solutions are expected to be encapsulated. In fact, said capsules have the color typical, of the solutions of the photochrome used in each case, which gives a first indication that their encapsulation has been produced in a satisfactory manner. On the other hand, the capsules are a dry solid which does not show a loss of solvent when they are subjected to a vacuum, nor do they leave a color stain (due to the photochrome) when they are deposited on a surface. However, when compression force was applied to the capsules of that type with larger dimensions (100-1000 μm), it was possible to observe in real time by means of optical microscopy the breaking of the capsules and the release of their internal content in the form of solution of the color expected for the photochrome. This demonstrates the encapsulation of the photochromic compound in the form of a solution inside the polyamide capsules.

In turn, relative density measurements have confirmed the presence of the different solvents in the capsules prepared. For example, the capsules containing toluene inside them (d=0.865 g/mL) remain suspended in the upper part of the system when dispersed in the aqueous phase (d=1 g/mL), while they are displaced to the lower part of the vessel when dispersed in acetone (d=0.791 g/mL). In turn, the capsules containing chloroform (d=1.483 g/mL) are deposited on the bottom of the vessel both in the aqueous phase as well as in acetone.

Lastly, the presence of solvent in the capsules prepared by means of proton nuclear magnetic resonance measurements has also been demonstrated. In fact, said measurements have allowed it to be proven that the solvent (toluene or chloroform) is maintained inside the capsules for weeks both if they are preserved in the open air or in an aqueous dispersion. This confirms the impermeability of the cortex of the polyamide capsules and the stability of the system prepared over time.

Once the properties of the capsules (size, impermeability, solvent content, etc.) were characterized, the optical behavior thereof was studied for the purpose of establishing whether the encapsulated photochromic compounds had the same photoactivity as in solution. To this end, the photochromic behavior of the capsules was compared with the photochromic behavior of the solutions of the same material and of the photochromic behavior of the rigid polymeric layers (of polystyrene (PS), polyvinyl acetate (PVAc) and polyvinyl alcohol (PVA)) wherein the photochromic compound is dispersed. Said study was centered on the determination of the thermal interconversion velocity B→A of the system, since the latter is the experimental parameter which is most sensitive to the properties of the environment of the photochrome. The measuring of this parameter was carried out by means of transition absorption spectroscopy which allows the state B of the photochrome to be generated by irradiating the material with a short monochromatic pulse of laser light and subsequently, monitoring the kinetics of the thermal interconversion process B→A by means of absorbance measurements. Said absorbance measurements, may be carried out both at the maximum absorbance of B (for which a deterioration of the signal is observed as B is transformed into A) as well as at the maximum absorbance of A (for which an increase of the signal is observed as B is transformed into A). In either of the two cases, the analysis of the temporal profiles of the change in absorbance measured allows the velocity of the process B→A to be established. In this case, our attention is centered in particular on determining the half-life time of the process ($t_{1/2}$), which consists of the time required for the initial concentration of B to decay by 50%. Said parameter and the kinetic profile of the process B→A have been determined for the following samples at ambient temperature.

Polymeric layers of PS, PVAc and PVA containing the photochromes of interest in their inside and which have been deposited by drop-casting on a glass surface, Polyamide capsules of various sizes containing the photochromes of interest and which have been deposited directly by drop-casting on a glass surface.

Table 2 and FIG. 4 show the results obtained in the kinetic measurements of the process B→A for the following photochromic systems: Photorome I, Photorome III or Disperse Red 13.

TABLE 2

Half-life times of the B → A process of various encapsulated photochromes or dispersions in polymeric matrices at room temperature. In the case of the encapsulated samples, the photochromes are dissolved in toluene or chloroform inside the capsules.

| Photochrome | Sample | $t_{1/2}$ (s) |
| --- | --- | --- |
| Photorome I | Dispersion in PVA | >74 |
| Photorome I | Dispersion in PS | 46 |
| Photorome I | Dispersion in PVAc | 21 |
| Photorome I | In capsules of 20-1000 nm (toluene) | 0.92 |
| Photorome I | In capsules of 1-100 μm (toluene) | 0.83 |
| Photorome I | In capsules of 100-1000 μm (chloroform) | 0.71 |
| Photorome III | Dispersion in PVA | >74 |
| Photorome III | Dispersion in PVAc | 47 |
| Photorome III | In capsules of 20-1000 nm (toluene) | 2.50 |
| Photorome III | In capsules of 1-100 μm (toluene) | 2.29 |
| Photorome III | In capsules of 100-1000 μm (toluene) | 2.26 |
| Disperse Red 13 | Dispersion in PVAc | 31 |
| Disperse Red 13 | In capsules of 100-1000 μm (toluene) | 0.20 |

From the graphics depicted in FIG. 4 and from the $t_{1/2}$ values shown in Table 2, it can be concluded that, independently from the chosen photochromic compound, its thermal reversion kinetics B→A is much more rapid inside the capsules than when the photochrome is dispersed directly in a rigid polymeric matrix. In fact, the behavior measured for the encapsulated systems is very similar to that described in the bibliography for these same photochromes in solution e.g. $t_{1/2}$=1.4 s for Photorome I in ethanol solutions at room temperature (Oxidation of photochromic spirooxazines by coinage metal cations. Part I. Reaction with $AgNO_3$: formation and characterization of silver particles, P. Uznanski, C. Amiens, B. Donnadieu, Y. Coppel, B. Chaudret, New J. Chem. 2001, 25, 1486-1494). Furthermore, said behavior is practically independent from the solvent introduced inside the capsules and from the size of said capsules within the range 20 nm-1000 μm. This shows one of the mains contributions of this invention: the optical and interconversion properties of any photochromic system may be maintained if said system is encapsulated in the form of a solution within micro and nanocapsules.

Example 2

The second example which is described in this patent application consists of the encapsulation of photochromic solutions inside melamine and formaldehyde capsules. Again, these capsules are prepared by, means of interfacial polymerization of the corresponding monomers (melamine and formaldehyde), adapting the methodology for the synthesis of impermeable microcapsules developed by S. J. Pastine et al. (Chemicals on Demand with Phototriggerable Microcapsules, S. J. Pastine, D. Okawa, A. Zettl, J. M. J. Fréchet, J. Am. Chem. Soc. 2009, 131, 13586-13587). As in the previous example, the synthesis of the capsules starts with the formation of an emulsion which is created when homogenizing (by means of sonication or vigorous magnetic stirring) a mixture formed by an aqueous phase which contains formaldehyde (37% w/w) and an organic phase (typically toluene) which contains the photochrome of interest and the stabilizer (PVP or SDS). Once the emulsion has been prepared, an aqueous melamine solution is added and the pH is adjusted until it reaches an acid medium which facilitates the polycondensation reaction and the formation of the melamine-formaldehyde chemically cross-linked polymer around the micro and nano droplets of organic solvent. In this way, hollow micro and nanocapsules are obtained with solvent inside thereof after about 2 hours, which will contain photochromic compounds if the latter have been initially dissolved in the organic phase.

By varying the experimental parameters, it has been possible to prepare three families of capsules with different sizes containing photochromic solutions inside them, as it has been determined by means of electronic and optical microscopy measurements:

Nanocapsules, with a diameter between 20-1000 nm (FIG. 5),
Small microcapsules, with a diameter between 1-100 µm (FIG. 6),
Large microcapsules, with a diameter between 100-1000 µm (FIG. 7).

Solutions of one single photochrome (Photorome I, see Table 1) have been introduced in said capsules, given that in the previous example, the universality of the methodology proposed here has already been demonstrated for any type of photochrome, independently from the optical properties and interconversion mechanism between the two states thereof. The properties of the resulting capsules have been studied in a form similar to that which has been carried out in said previous example. Thus, on the one hand, electronic and optical microscopy measurements have allowed the core-shell type structure of these capsules to be established which consist of a melamine-formaldehyde cortex and a hollow internal cavity (see FIGS. 5-7). On the other hand, the presence of solvent inside the capsules has been demonstrated by means of compressing and breaking of, the larger capsules, relative density measurements and proton nuclear magnetic resonance measurements.

The thermal reversion kinetics B→A of the photochromic solutions of Photorome I inside the melamine-formaldehyde capsules has been characterized by means of transition absorption spectroscopy measurements. In this case, our attention has not been centered on researching the dependence of the photochromic behavior on the size of the capsules, since this aspect has been studied extensively in the previous example. However, it is intended to compare the behavior of the photochromic coatings, prepared on the basis of capsules, with those in which the photochromes are directly dispersed without encapsulation. For this purpose, measurements of three different systems have been made:

PVA polymeric layers containing Photorome I photochrome dispersed directly inside and which have been deposited by drop-casting on a glass surface,
Melamine-formaldehyde capsules, 1-1000 µm in size, containing solutions of Photorome I in toluene and which have been deposited directly by drop-casting on a glass surface,
PVA polymeric layers containing melamine-formaldehyde capsules, 1-1000 µm in size, inside of which solutions of Photorome I in toluene are found and which have been deposited directly by drop-casting on a glass surface.

The half-life times measured for these three systems are shown on Table 3. The following conclusions can be inferred from these data:

The thermal reversion kinetics B→A of the Photorome I photochrome is much more rapid inside the melamine-formaldehyde capsules than when it is dispersed directly in a rigid environment such as the PVA polymeric layer, which demonstrates the advantageous aspect of the encapsulation;
The thermal reversion kinetics B→A of the Photorome I photochromes is similar both inside the melamine-formaldehyde capsules as well as inside polyamide capsules (see Table 2), which indicates the generality of the methodology which is proposed in this patent in relation to the material with which the cortex of the capsules is prepared;
The thermal reversion kinetics B→A of the Photorome I photochrome inside melamine-formaldehyde capsules is independent from the medium in which said capsules are found, whether directly deposited on glass or dispersed inside a rigid PVA matrix;
The dispersion of the capsules prepared inside the rigid polymeric matrices allows photochromic coatings with suitable mechanical properties to be obtained and the photoactivity of which reproduces the photoactivity observed for the photochrome in solution, i.e. they maintain rapid B→A interconversion velocities.

TABLE 3

Half-life time of the B → A process of the Photorome I photochrome in various media at room temperature.

| Sample | $t_{1/2}$ (s) |
|---|---|
| Photochrome dispersed in PVA | >74 |
| Photochrome in melamine-formaldehyde capsules | 2.22 |
| Photochrome in melamine-formaldehyde capsules dispersed in PVA | 2.30 |

In conclusion, it may be affirmed that different families of micro and nanocapsules which contain inside them different types of photochromic compounds and solvents have been developed. As this invention claims, subsequent studies of transition absorption spectroscopy have demonstrated that the encapsulated photochromes interconvert with a kinetics similar to that observed for the same photochrome in solution, confirming that the encapsulation of these compounds allows their properties to be preserved without them being affected by the presence of a rigid external matrix in which the photochrome capsules are dispersed. This behavior has been observed for various types of capsules (size, material of the cortex), photochromes, solvents and rigid matrices, which demonstrates the universality of the methodology proposed in this invention. This allows the preparation of all types of photochromic coatings based on the encapsulation of solutions of the systems of interest and their subsequent dispersion in rigid polymeric matrices.

The invention claimed is:

1. Coating with photochromic properties applicable to optical articles and glazed surfaces, comprising:
   a coating formed by a polymeric matrix deposited on a surface of an article, in which photochromic compounds are included, wherein
   said photochromic compounds are heat reversible photochromic compounds selected from the group consisting of spirooxazine, azobenzenes and chromenes,
   said photochromic compounds are encapsulated inside hollow and sealed nanocapsules with a diameter between 20-1000 nm,
   said photochromic compounds are dissolved in a liquid solvent that does not react with the photochromic compounds and does not react with the wall or cortex of the nanocapsules, forming a solution inside the nanocapsules,
   said nanocapsules are dispersed inside said polymeric matrix,
   said wall or cortex of the nanocapsules is made of polyamide or melamine and formaldehyde; and
   said liquid solvent is a liquid solvent non-miscible with water selected from the group consisting of chloroform and toluene.

2. Coating according to claim 1, which comprises nanocapsules which encapsulate one or more different photochromic systems, dissolved in the liquid solvent, such that said systems absorb at different wavelengths.

3. Coating according to claim 1, wherein the polymeric matrix inside which the nanocapsules are dispersed with photochromic solutions may be organic, inorganic or hybrid and comprises polyvinyl alcohol, polyvinyl acetate or polystyrene.

4. Method for producing a coating with photochromic properties applicable to optical articles and glazed surfaces according to claim 1, wherein said method comprises encapsulation of the photochromic compounds in the hollow and sealed nanocapsules in solution in the liquid solvent that does not react with the photochromic compounds and does not react with the wall or cortex of the nanocapsules, and dispersion of said nanocapsules in the polymeric matrix deposited on a surface of an article.

5. Method of using the coating with photochromic properties according to claim 1, wherein said method comprises covering a surface of an article with the coating.

6. Method of using according to claim 5, wherein said article covered with the coating is an optical lens.

7. Method of using according to claim 5, wherein said article covered with the coating is a transparent or translucent glazed surface.

8. Method of using according to claim 5, wherein said article covered with the coating is a reflective glazed surface and suited for being used as a mirror.

9. Method of using according to claim 5, wherein the surface of the article is an optical article, or a glazed surface.

10. Method of using according to claim 5, wherein the covering is applied for temporary staining.

* * * * *